United States Patent [19]

Herbst et al.

[11] Patent Number: 4,830,728
[45] Date of Patent: May 16, 1989

[54] UPGRADING NAPHTHA IN A MULTIPLE RISER FLUID CATALYTIC CRACKING OPERATION EMPLOYING A CATALYST MIXTURE

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 159,464

[22] Filed: Feb. 19, 1988

Related U.S. Application Data

[63] Continuation of Ser. No. 903,183, Sep. 3, 1986, abandoned.

[51] Int. Cl.$^4$ .................. C10G 59/02; C10G 59/06
[52] U.S. Cl. .................................. 208/78; 208/49; 208/67; 208/70; 208/74; 208/79; 208/113; 208/120; 208/135; 585/322
[58] Field of Search .................. 208/49, 62, 63, 64, 208/69, 70, 78, 79, 155, 113, 67, 74, 120; 585/322

[56] References Cited

U.S. PATENT DOCUMENTS

| | | | |
|---|---|---|---|
| 3,617,497 | 11/1971 | Bryson et al. | 208/80 |
| 3,748,251 | 7/1973 | Demmel et al. | 208/74 |
| 3,847,793 | 12/1974 | Schwartz et al. | 208/70 |
| 3,849,291 | 11/1974 | Owen | 208/78 |
| 3,886,060 | 5/1975 | Owen | 208/155 |
| 3,894,931 | 7/1975 | Nace et al. | 208/73 |
| 3,894,932 | 7/1975 | Owen | 208/74 |
| 3,894,933 | 7/1975 | Owen et al. | 208/77 |
| 3,894,934 | 7/1975 | Owen et al. | 208/78 |
| 3,894,935 | 7/1975 | Owen | 208/78 |
| 3,907,663 | 9/1975 | Owen | 208/155 |
| 3,926,778 | 12/1975 | Owen et al. | 208/74 |
| 3,928,172 | 12/1975 | Davis, Jr. et al. | 208/77 |
| 3,974,062 | 8/1976 | Owen et al. | 208/74 |
| 4,090,949 | 5/1978 | Owen et al. | 208/78 |
| 4,116,814 | 9/1978 | Zahner | 208/155 |
| 4,287,088 | 9/1981 | Sirkar | 208/520 T |
| 4,309,279 | 1/1982 | Chester et al. | 208/120 |
| 4,332,674 | 6/1982 | Dean et al. | 208/155 |
| 4,368,114 | 1/1983 | Chester et al. | 208/120 |
| 4,436,613 | 3/1984 | Sayles et al. | 208/155 |
| 4,490,241 | 12/1984 | Chou | 208/75 |
| 4,606,810 | 8/1986 | Krambeck et al. | 208/155 |
| 4,717,466 | 1/1988 | Herbst et al. | 208/113 |
| 4,749,470 | 6/1988 | Herbst et al. | 208/85 |
| 4,752,375 | 6/1988 | Herbst et al. | 208/74 |

*Primary Examiner*—Anthony McFarlane
*Attorney, Agent, or Firm*—Alexander J. McKillop; Charles J. Speciale; Richard D. Stone

[57] ABSTRACT

A catalytic cracking process is provided featuring multiple risers in which a variety of hydrocarbon conversion reactions take place, a stripping unit in which entrained hydrocarbon material is removed from catalyst and a regeneration zone in which spent cracking catalyst is regenerated, which comprises:

(a) converting a relatively high boiling hydrocarbon charge material in a first riser in the presence of a first catalyst component which is an amorphous cracking catalyst and/or a large pore crystalline zeolite cracking catalyst to provide lighter products;

(b) converting an ethylene-rich charge material introduced to a second riser at a lower level thereof in the presence of a second catalyst component which is a shape selective medium pore crystalline silicate zeolite catalyst to provide heavier products and to increase the temperature of the catalyst in said region; and, (c) converting a naphtha charge material introduced to the second riser at a higher level thereof in the presence of said second catalyst component to provide a relatively high octane gasoline product.

17 Claims, 2 Drawing Sheets

4,830,728

UPGRADING NAPHTHA IN A MULTIPLE RISER FLUID CATALYTIC CRACKING OPERATION EMPLOYING A CATALYST MIXTURE

This is a continuation of copending application Ser. No. 903,188, filed on Sept. 3, 1986, now abandoned.

BACKGROUND OF THE INVENTION

This invention relates to a process for upgrading a naphtha, e.g., straight run naphtha, catalytically cracked naphtha (FCC gasoline), etc., and mixtures thereof, in a multiple riser fluid catalytic cracking operation utilizing a mixture of amorphous cracking catalyst and/or large pore crystalline cracking catalyst, e.g., zeolite Y, and a shape selective medium pore crystalline silicate zeolite catalyst, e.g., zeolite ZSM-5.

In known and conventional fluidized catalytic cracking processes, a relatively heavy hydrocarbon feedstock, e.g., a gas oil, admixed with a suitable cracking catalyst, e.g., a large pore crystalline silicate zeolite such as zeolite Y, to provide a fluidized suspension is cracked in an elongated reactor, or riser, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidized catalyst is continuously circulated between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,932, 4,051,013, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers).

In accordance with the fluid catalytic cracking process of U.S. Pat. No. 4,051,013, a naphtha feed and a gas oil feed are converted in the presence of an amorphous or zeolite cracking catalyst, preferably the latter, in a riser reaction zone to provide a high octane gasoline.

Several of these processes employ a mixture of catalysts having distinctly different catalytic properties as, for example, the dual riser catalytic cracking process described in U.S. Pat. No. 3,928,172 which utilizes a mixture of a large pore crystalline silicate zeolite cracking catalyst, e.g., zeolite REY, and a shape selective medium pore crystalline silicate zeolite, e.g., ZSM-5. According to this process, a gas oil is cracked in a first riser in the presence of the aforesaid catalyst mixture, principally as a result of the zeolite REY component thereof, to provide a heavy naphtha product, the latter being recracked and/or a virgin straight run naphtha being cracked in a second riser in the presence of the catalyst mixture to provide a high octane gasoline product together with varying quantities of $C_3$ and $C_4$ olefins.

SUMMARY OF THE INVENTION

It is an object of the invention to upgrade naphtha to a relatively high octane gasoline product in a fluid catalytic cracking operation featuring at least two riser reaction zones, at least one stripping zone and at least one catalyst regeneration zone employing a mixed catalyst system comprising, as a first catalyst component, an amorphous cracking catalyst and/or a large pore crystalline silicate containing cracking catalyst and, as a second catalyst component, a shape selective medium pore crystalline silicate zeolite containing catalyst.

It is a particular object of the present invention to carry out a fluidized catalytic cracking operation employing said mixed catalyst system in which a heavy hydrocarbon feed, e.g., gas oil and/or resid, is cracked in a first riser reaction zone, primarily due to the presence of the first catalyst component, to provide lighter products including significant quantities of naphtha, ethylene is converted in the lower region of a second riser, primarily due to the presence of the second catalyst component, to provide higher molecular weight products including light olefins, aromatics, etc., and to simultaneously increase the temperature of the catalyst in said region and catalytically cracked naphtha recycled from the first riser and/or other naphtha charge material is selectively cracked in a higher region of the second riser, again, primarily due to the presence of the shape selective second catalyst component, to provide a relatively high octane gasoline product.

It is still another object of the invention to upgrade a naphtha feed to a high octane gasoline product in a dual riser catalytic cracking unit wherein different physical characteristic(s) of the first and second catalyst components permits separation, or segregation, of the catalyst components within a common stripping vessel and/or a prolongation of the residency time of the second catalyst component within one of the risers, the net result being a capability for reducing the rate of circulation of the less coke deactivated second catalyst component through the regeneration zone, and consequently, a conservation of its catalytic activity.

In keeping with the foregoing objects, there is provided a catalytic cracking operation featuring multiple risers in which a variety of hydrocarbon conversion reactions takes place, a stripping unit in which entrained hydrocarbon material is removed from catalyst and a regeneration zone in which spent cracking catalyst is regenerated, which comprises:

(a) converting a relatively high boiling hydrocarbon charge material in a first riser in the presence of a first catalyst component which contains an amorphous cracking catalyst and/or a large pore crystalline silicate cracking catalyst to provide lighter products;

(b) converting an ethylene-rich charge material introduced to a second riser at a lower level thereof primarily in the presence of a second catalyst component which contains a shape selective medium pore crystalline silicate zeolite to provide heavier products and to increase the temperature of the catalyst in said region; and, (c) converting a naphtha charge material introduced to the second riser at a higher level thereof in the presence of said second catalyst component to provide a relatively high octane gasoline product.

The term "catalyst" as used herein shall be understood to apply not only to a catalytically active material but to one which is composited with a suitable matrix component which may or may not itself be catalytically active.

Temperature control within each riser, and therefore the nature of the principal conversion products produced therein, can be achieved by controlling the quantity of hot regenerated cracking catalyst cycled thereto and, in the case of the second riser, by controlling the quantity of the ethylene-rich feed. As a result of such temperature control, and by suitable regulation of the catalyst contact times, it is possible to operate the process so as to maximize the overall conversion of feed to high octane gasoline or, if desired, the production of light olefins (at some expense to gasoline quality and yield) such as $C_3$ and/or $C_4$ olefins for use in alkylation reactions.

DESCRIPTION OF THE PREFERRED EMBODIMENTS

Figure 1:
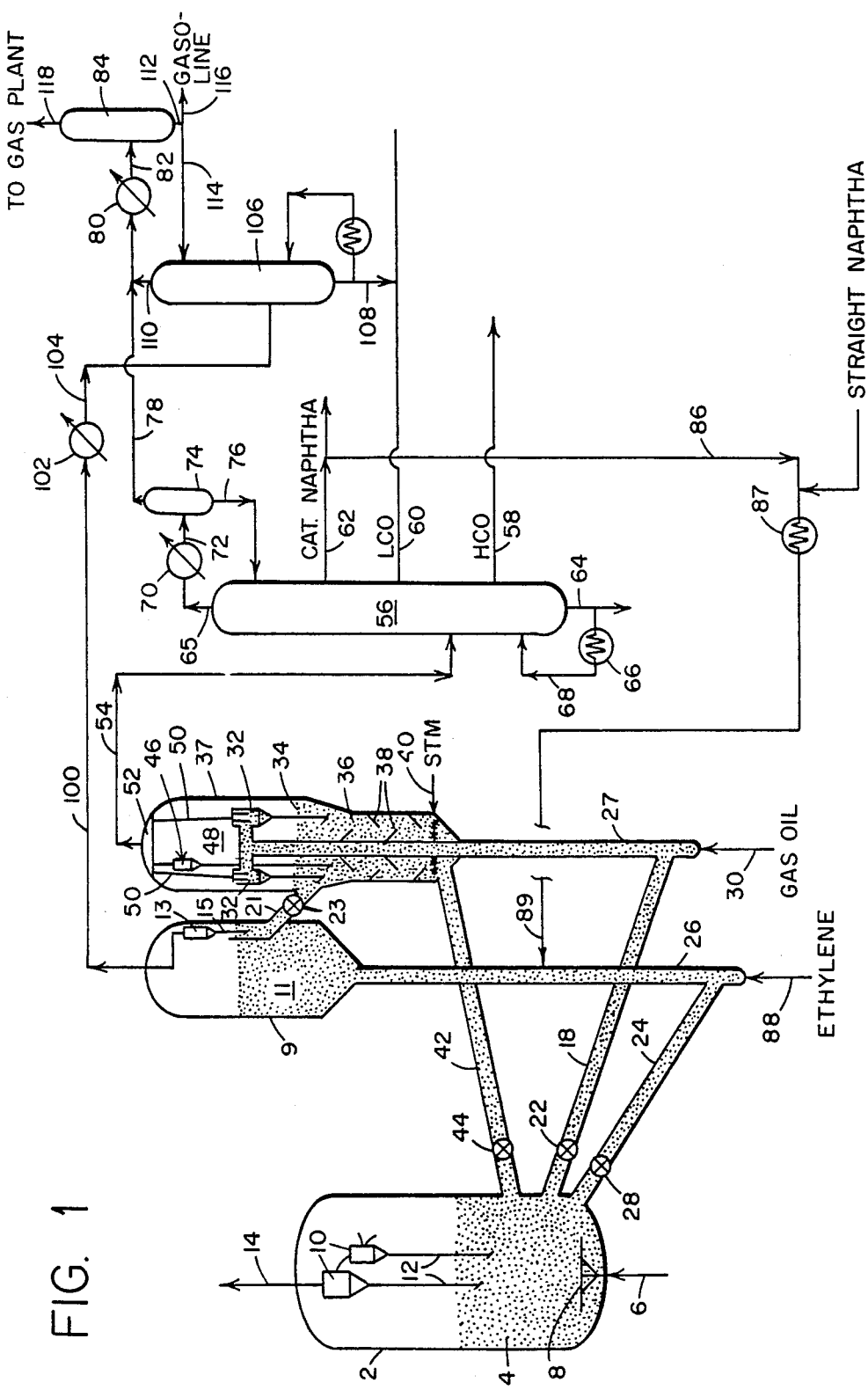
FIG. 1 schematically illustrates a naphtha upgrading operation in accordance with this invention; and, FIG. 2 schematically illustrates another type of naphtha upgrading operation of the present invention wherein the stripping unit features means for separating the first and second catalyst components based primarily on differences in their average particle sizes and densities, such arrangement making it possible to cycle the second catalyst component without exposing it to the catalyst-degrading conditions of the regenerator.

Conventional cracking catalyst components are generally amorphous silica-alumina and crystalline silica-alumina. Other materials said to be useful as cracking catalysts are the crystalline silicoaluminophos- phates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst systems utilized herein.

It is, of course, within the scope of this invention to employ two or more of the foregoing amorphous and-/or large pore crystalline cracking catalysts as the first catalyst component of the mixed catalyst system. Preferred large pore crystalline silicate zeolite components of the mixed catalyst composition herein include the synthetic faujasite zeolites X and Y with particular preference being accorded zeolites Y, REY, USY and RE-USY.

The shape selective medium pore crystalline silicate zeolite catalyst constituting the second catalyst component of the mixed catalyst system is exemplified by ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Reissue Pat. No. 29,948 describing and claiming a crystalline material with an X-ray diffraction pattern of ZSM-5, is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective medium pore crystalline silicate zeolite components of the mixed catalyst system herein are ZSM-5, ZSM-11, ZSM-12, ZSM-23, ZSM-35, ZSM-38 and ZSM-48 with ZSM-5 being particularly preferred.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, titanium and any other trivalent metal which is heavier than aluminum. Specific examples of such catalysts include ZSM-5 and zeolite Beta containing boron, gallium and/or titanium. In lieu of, or in addition to, being incorporated into the zeolite framework, these and other catalytically active elements can also be deposited upon the zeolite by any suitable procedure, e.g., impregnation.

In known and conventional fluidized catalytic cracking operations employing mixtures of large and medium pore size crystalline silicate zeolite catalysts where catalyst separated from the product effluent is conveyed to a stripper and from there to a catalyst regenerating zone, regardless of the nature of the catalyst introduction at start-up, once steady-state operation has been achieved, the two types of catalyst will become fairly uniformly mixed and will circulate throughout the system at or about the same rate. This arrangement is subject to a significant disadvantage. While the large pore zeolite cracking catalyst cokes up relatively quickly and must therefore be regenerated at frequent intervals, this is not the case with the medium pore zeolite catalysts which can maintain their catalytic activity over many more cycles of operation. However, since the large and medium pore zeolite catalysts are in intimate admixture, heretofore there has been no practical means of conveying only the large pore zeolite catalyst to the catalyst regenerator unit or, what amounts ot the same thing, keeping the medium pore zeolite catalyst, or at least most of it, on the average out of the regenerator.

Thus, a principal disadvantage resulting from the use of mixed catalyst systems in known fluidized catalytic cracking operations is owing to the fact that the medium pore zeolite catalyst component is subjected to the harsh hydrothermal conditions of the catalyst regenerator unit even though it does not require regeneration anywhere near the rate at which the large pore zeolite cracking catalyst component must be regenerated. The medium pore zeolite catalyst is therefore needlessly subjected to hydrothermal deactivation at a much greater rate than is necessary for it to function.

Separating the mixed catalyst system into its first and second catalyst components in accordance with preferred embodiments of the process herein for upgrading naphtha does much to overcome this drawback. Thus, once particles of first component are separated from particles of second component, the former can be conveyed to the regenerator while the latter can be cycled directly back to the appropriate riser thereby avoiding passage through the regenerator. Such separation can precede or follow stripping of the catalyst components. As applied, for example, to a fluidized catalyst cracking process in which a cracking catalyst requiring frequent regeneration such as zeolite Y is employed in combination with a less coke deactivated shape selective medium pore crystalline silicate zeolite catalyst requiring comparatively infrequent regeneration such as ZSM-5, the present invention makes it possible to sustain relatively high levels of activity of the latter catalyst for much longer periods than would otherwise be the case due to the reduced incidence of its exposure to the catalyst-degrading environment of the regenerator zone. This, in turn, permits the refiner to take greater advantage of the unique catalytic cracking operation.

Separation of particles of first catalyst component from particles of second catalyst component in the stripping unit can be accomplished in several ways. For example, the two components can be provided in such different average particle sizes that they can be readily sorted within a stripping unit possessing suitable sieving means, an arrangement more particularly described in connection with the dual riser fluidized catalytic cracking unit illustrated in FIG. 2, infra.

Separation within the stripping zone can also be achieved by classifying the first and second catalyst components according to their average particle densities which can be made to be significantly different in various ways including by appropriate selection of the matrix components with which they are composited as more fully explained below. In general, smaller, less dense catalyst particles will tend on the average to define an upper phase within the stripper floating upon larger, more dense catalyst particles which, conversely, will tend on the average to define a lower phase within the stripper.

It is also within the scope of this invention to impart such different physical characteristic(s) to the first and second catalyst components that they each will exhibit different settling rates, designated $R_1$ and $R_2$ respectively, which permit the catalyst particles having the greater settling rate to remain within a riser reaction zone longer than the catalyst particles having the lower settling rate. Preferably, the second catalyst component, i.e., the less coke deactivated one, is given a higher settling rate as to reside in the second riser for a longer period of time than the first catalyst component.

Residency time of catalyst particles in a riser is primarily dependent on two factors: the linear velocity of the fluid stream within the riser which tends to carry the entire catalyst bed/conversion products/unconverted feed up and out of the riser into the separator unit and the opposing force of gravity which tends to keep the slower moving catalyst particles within the riser. Ordinarily, in a mixed catalyst system, both catalyst components will circulate through the system at about the same rate. As previously pointed out, this has proven disadvantageous to the efficiency of the system since the medium pore zeolite catalyst or other catalyst component which does not require as frequent regeneration as the cracking catalyst will be needlessly subjected to the catalyst-degrading conditions of the regenerator with the result that its useful catalytic life will be shortened. However, in accordance with this invention, it is possible to retain the less coke deactivated catalyst within the riser, even to the point where, because of a balance between the upward velocity of this catalyst component and its settling rate, it can be made to remain more or less stationary, or suspended, at any desired level within the riser defining a zone of concentration therein. To bring about this balance or to otherwise prolong the residency time of a particular component of the mixed catalyst system within the riser, the average density, particle size and/or shape of the catalyst particles can be adjusted in a number of ways as to provide the desired settling characteristics. As a general guide, as the average particle size of the catalyst increases and/or its average particle density increases, the residency time of the catalyst will increase.

Assuming, for example, this differential in $R_1$ and $R_2$ is accomplished by making the particles of the second catalyst component initially larger and of greater density than the particles of first catalyst component and perhaps even more irregular in shape than the latter, gradual attrition of the larger particles (through particle collision) will progressively reduce their capability for prolonged residency in the riser and as time goes on, increasing quantities of such particles will enter the stripping zone where, however, they can still be readily separated based on their different densities as later more fully explained. This arrangement, i.e., increased residency time in the riser coupled with separation in the stripping zone, maximizes the capability of the catalytic cracking process of this invention for reducing the rate of circulation of the less coke deactivated catalyst particles through the regenerator zone.

Among the techniques which can be used for making one catalyst component more dense than the other is compositing each catalyst with a matrix component of substantially different density. Useful matrix components include the following:

| matrix component | particle density (gm/cm$^3$) |
| --- | --- |
| alumina | 3.9–4.0 |
| silica | 2.2–2.6 |
| magnesia | 3.6 |
| beryllia | 3.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be more dense than the catalyst requiring frequent regeneration. For example, in the case of a mixed catalyst system containing medium pore and large pore crystalline silicate zeolites where it is desired to increase the residency time of the medium pore zeolite catalyst in the riser, the overall packed density of the medium pore zeolite catalyst particles inclusive of its matrix component can advantageously vary from about 0.6 to about 4.0 gm/cm$^3$, and preferably from about 2.0 to about 3.0 gm/cm$^3$, and the overall packed density of the large pore zeolite catalyst particles inclusive of its matrix component can advantageously vary from about 0.4 to about 1.1 gm/cm$^3$ density, and preferably from about 0.6 to about 1.0 gm/cm$^3$.

Another useful technique for adjusting the density of each catalyst component, again in the case of a mixture of medium and large pore zeolite catalysts, is to composite the medium pore zeolite catalyst particles with a material which tends to coke up faster than the particles of large pore zeolite, such resulting in an increase in the density of the former in situ. Illustrative of such materials are hydrated alumina which in situ forms a transition alumina which has a rapid coking rate. This embodiment possesses several additional advantages. In the coked-up state, the composited medium pore silicate zeolite catalyst is more resistant to attrition which results from collision with other particles in the riser. The individual catalyst particles can sustain more collisions and thus serve as a practical means of adjusting the velocity of the large pore zeolite catalyst particles through the riser (the latter in colliding with the medium pore zeolite catalyst particles will, as a result, have reduced velocity). In addition, the coked-up composited medium pore zeolite catalyst particles will tend to accumulate metals present in the feed.

As previously stated, the relative settling rate of each catalyst component can be selected by varying the average particle size of the catalyst particles. This can be readily accomplished at the time of compositing the catalyst particles with various matrix components. As between two catalyst components of significantly different average particle size, the larger will tend to remain within the riser longer than the smaller. Where it is desired to increase the residency time, say, of the medium pore zeolite catalyst particles in the riser over that of the large pore zeolite catalyst component, the average particle size of the former will usually be larger than that of the latter. So, for example, the average particle size of the medium pore zeolite catalyst particles can be made to vary from about 500 microns to about 70,000 microns, and preferably from about 1000 to about 25,000 microns while the average particle size of the large pore zeolite catalyst particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the longer the residency time of the particles in the riser. Irregular-shaped particles can be simply and readily achieved by crushing the catalyst-matrix extrudate or using an extruded catalyst.

As will be appreciated by those skilled in the art, the settling rate for a particular catalyst component will result from the interaction of each of the three foregoing factors, i.e., density, average particle size and particle shape. The factors can be combined in such a way that they each contribute to the desired result. For example, the particles of the less coke deactivated catalyst can simultaneously be made denser, larger and more irregular in shape than the catalyst particles requiring frequent regeneration. However, a differential settling rate can still be provided even if one of the foregoing factors partially offsets another as would be the case where greater density and smaller average particle size coexist in the same catalyst particle. Regardless of how these factors of particle density, size and shape are established for a particular catalyst component, their combined effect will, of course, be such as to result in a significant differential in settling rates of the components comprising the mixed catalyst system of this invention.

By varying the cross sectional geometry of the riser, it is possible to further prolong the residency time therein of the denser, larger and/or more irregularly shaped catalyst particles. Numerous geometric configurations can be utilized to achieve this effect. So, for example, the riser can be made to flare outwardly for a part of its length. In one such arrangement, some portion of the upper section of the riser can be flared outwardly. The denser, larger and/or more irregularly shaped particles will tend to occupy the flared region of the riser as to constitute a zone of concentration therein.

The shape selective medium pore crystalline silicate zeolite catalyst can be present in the mixed catalyst system over widely varying levels. For example, the zeolite concentration of the second component can be present at a level as low as about 0.01 to about 1.0 weight percent of the total catalyst inventory (as in the case of the catalytic cracking process of U.S. Pat. No. 4,368,114) and can represent as much as 25 weight percent of the total catalyst system.

Suitable charge stocks for cracking in the first riser comprise the hydrocarbons generally and, in particular, petroleum fractions having an initial boiling point range of at least 400° F., a 50% point range of at least 500° F. and an end point range of at least 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking.

The expression "naphtha charge material" shall be understood to include any hydrocarbon charge stock boiling in the range of $C_5$ hydrocarbons up to about 450° F. Such charge materials are generally unsuitable for use as motor fuel or motor fuel components because of their relatively low octane rating, poor stability, high contaminant levels of sulfur or nitrogen or both or any combination of these characteristics. Examples of suitable naphtha charge materials include coker naphtha, visbreaker naphtha, pyrolysis naphtha (from an ethylene operation), straight run naphtha and catalytically cracked naphtha.

Referring to FIG. 1, there is shown a first (gas oil) riser reactor associated with a product fractionation facility in combination with a second (ethylene/naphtha) riser reactor with its own independent product recovery system. Regenerator 2 is shown containing a bed of spent large pore crystalline silicate zeolite cracking catalyst 4, e.g., zeolite Y, REY, USY or RE-USY, which is contacted with an oxygen-containing regeneration gas such as air introduced by conduit 6 to an air distributor grid 8. Cyclone separators 10 provided with diplegs 12 are located in the upper portion of the regenerator for separating flue gases from entrained catalyst particles. The separated catalyst particles are returned by diplegs 12 to catalyst bed 4 and flue gases are removed by conduit 14. Regenerated catalyst is removed from bed 4 and conveyed to conduit 18 communicating with the lower end of riser 27. A catalyst flow control valve 22 is provided in conduit 18. Regenerated catalyst is also conveyed by conduit 24 to the bottom portion of second (ethylene/naphtha) riser 26. Catalyst flow control valve 28 is provided in conduit 24. A gas oil charge material boiling in the range of from about 600° F. to about 1200° F. is introduced by conduit 30 to the bottom of first riser 27 where it combines with hot regenerated catalyst introduced by conduit 18 to form a catalyst-oil suspension. The conversion conditions within first riser 27 can be varied depending upon whether it is desired to maximize production of high octane gasoline or light olefins, principally $C_3$ and $C_4$ olefins but including some ethylene as well. When it is desired to emphasize the production of high octane gasoline, the ZSM-5 zeolite concentration can represent from about 0.1 to about 5, and preferably from about 0.2 to about 3.0, weight percent of the catalyst mixture and the temperature can range from about 900° to about 1150° F. and preferably from about 925° to about 1000° F., the catalyst to oil ratio can range from about 3:1 to about 20:1 and preferably from about 4:1 to about 10:1 and the catalyst contact time can range from about 0.5 to about 30 seconds and preferably from about 1 to about 15 seconds. When, however, light olefin production (at the expense of naphtha) is desired, the ZSM-5 zeolite concentration can comprise from about 1 to about 25, and preferably from about 3 to about 10, weight percent of the catalyst mixture, the temperature, catalyst to oil ratio and catalyst contact time being selected from the aforementioned ranges. During passage of the suspension through the riser, conversion of the gas oil feed to lower boiling products occurs. These products are separated after removal of catalyst therefrom in a product fractionator as described below. The catalyst-hydrocarbon system after traversing the riser reactor is caused to flow directly into a plurality of cyclonic separators 32 attached to the end of the riser through a T-connection and located within the upper section of vessel 37. Diplegs 34 attached to separators 32 pass separated catalyst to a stripping zone 36 provided with baffles 38 which is located within the lower section of vessel 37. Hydrocarbons are passed from separators 32 to plenum chamber 52 via conduits 50. Stripping gas such as steam is introduced to the lower section of the stripping zone by conduit 40. Stripped catalyst is removed from the lower section of the stripping zone by conduit 42 and conveyed to the bed of catalyst 4 in the regeneration zone. A flow control valve 44 is provided in conduit 42.

Stripping gas and stripped hydrocarbon material are removed from the bed of catalyst in the stripping zone and enter cyclone separator 46 wherein entrained catalyst particles are separated from the stripping gas. Separated catalyst particles are returned to the catalyst bed by dipleg 48. Stripping gas and hydrocarbon material are then passed from separator 46 by a connecting conduit to plenum chamber 52. Hydrocarbon material and stripping gas are conveyed from plenum chamber 52 by conduit 54 to a fractionator 56.

Fractionator 56 is employed upon to separate a heavy cycle oil (HCO) withdrawn by conduit 58; a light cycle oil (LCO) withdrawn by conduit 60; a heavy naphtha fraction withdrawn by conduit 62; material boiling below the heavy naphtha fraction withdrawn by conduit 65 and a bottoms fraction withdrawn by conduit 64. All or a portion of the bottoms fraction can be passed through heater 66 and returned to the bottom of tower 56 by conduit 68. Generally, the temperature of the bottom of the tower will be about 690° F. The material boiling below the heavy naphtha fraction and withdrawn from the fractionator by conduit 65 is passed through cooler 70 and thereafter by conduit 72 to drum 74 maintained at a temperature of about 100° F. In drum 74 a liquid condensate is recovered and recycled by conduit 76 to the upper section of fractionator 56 as reflux. Uncondensed product is withdrawn from drum 74 by conduit 78 and passed to cooler 80 and conduit 82 to drum 84 maintained at a temperature of about 100° F.

An ethylene-rich charge material, e.g., one containing at least about 10, and preferably at least about 20, weight percent ethylene (the balance being made up largely of highly reactive light olefins such as propylene and/or butylenes) and including an essentially pure ethylene feed, is introduced by conduit 88 to second (ethylene/naphtha) riser 26 at a lower level thereof where it combines with hot regenerated catalyst transferred from regenerator 2 through conduit 24 to form a suspension. The conditions of conversion of the ethylene-rich feed in the lower section of riser 26 can include a temperature of from about 400° to about 950° F. and preferably from about 500° to about 850° F., a catalyst to charge material ratio of from about 5:1 to about 20:1 and preferably from about 10:1 to about 15:1 and a catalyst contact time of from about 10 to about 180 seconds and preferably from about 100 to about 140 seconds. The relatively high partial pressure of ethylene permits its maximum conversion in the lower section of riser 27 to a variety of other products. A typical conversion product profile for the conversion of ethylene in the lower section of riser 26 is as follows:

| Product | Weight Percent |
| --- | --- |
| $C_5+$ (includes paraffins, olefins, aromatics, naphthenes, etc.) | 73.0 |
| pentanes | 14.8 |
| n-butane | 1.6 |
| isobutane | 4.6 |
| butene | 6.5 |
| propane | 2.5 |
| propylene | 2.3 |
| ethane | 0.6 |
| ethylene | 8.8 |
| methane | 0.1 |

The conversion reaction, which is exothermic, increases the temperature of the catalyst prior to contact with the naphtha introduced further up the riser thereby providing conditions conducive to maximum production of relatively high octane gasoline for a given quantity of feed.

All or part of the catalytically cracked naphtha separated in fractionator 56 and withdrawn therefrom by conduit 62 is conveyed by conduit 86 through heater 87 to riser reactor 26 at a higher level thereof through conduit 89. The naphtha combines with the ascending catalyst-hydrocarbon vapor mixture at a temperature within the range of from about 850° to about 1050° F. A straight run naphtha can be used in partial or total replacement of catalytically cracked naphtha. The suspension continues to ascend riser 26 and is discharged into the bottom of an enlarged zone 9 containing a dense fluid bed of mixed catalyst. Alternatively, the second catalyst component can be designed to have higher average particle size and/or higher average particle density to increase the residence time of this component in enlarged zone 9. Further cracking of the naphtha is accomplished in the dense fluid catalyst bed 11. Hydrocarbon vapors are passed through one or more cyclone separators 13 provided with catalyst dipleg 15. The hydrocarbon vapors are withdrawn by conduit 100 and conveyed to the product separator previously described. Catalyst is withdrawn from the upper surface of fluid bed 11 by conduit 21 provided with a flow control valve 23 and enters stripping zone 36 of vessel 37. Following stripping, the spent catalyst is transferred through conduit 42 provided with valve 44 to regenerator 2 as previously described. Temperature control in each riser can in part be achieved by regulating the quantities of hot, freshly regenerated catalyst conveyed thereto.

Hydrocarbon vapors recovered from cyclone separator 13 are conveyed by conduit 100 to cooler 102 wherein the vapors may or may not be cooled. The vapors are then conveyed by conduit 104 to tower 106 maintained at a bottom temperature of about 550° F. and a top temperature of about 350° F. A bottoms product boiling in the light cycle oil boiling range is withdrawn from the bottom of the tower by conduit 108 and combined with light cycle oil in conduit 60 withdrawn from fractionator 56. An overhead hydrocarbon portion is withdrawn from tower 106 by conduit 110 and combined with hydrocarbon material in conduit 78. Condensate material comprising gasoline-boiling range material is withdrawn from drum 84 by conduit 112 and recycled in part by conduit 114 to tower 106 as reflux. The remaining gasoline-boiling range condensate material is recovered by conduit 116. Uncondensed vaporous material, including light olefin components such as propylene and butenes, is withdrawn from drum 84 by conduit 118 and sent to, for example, the refinery gas plant.

Figure 2:
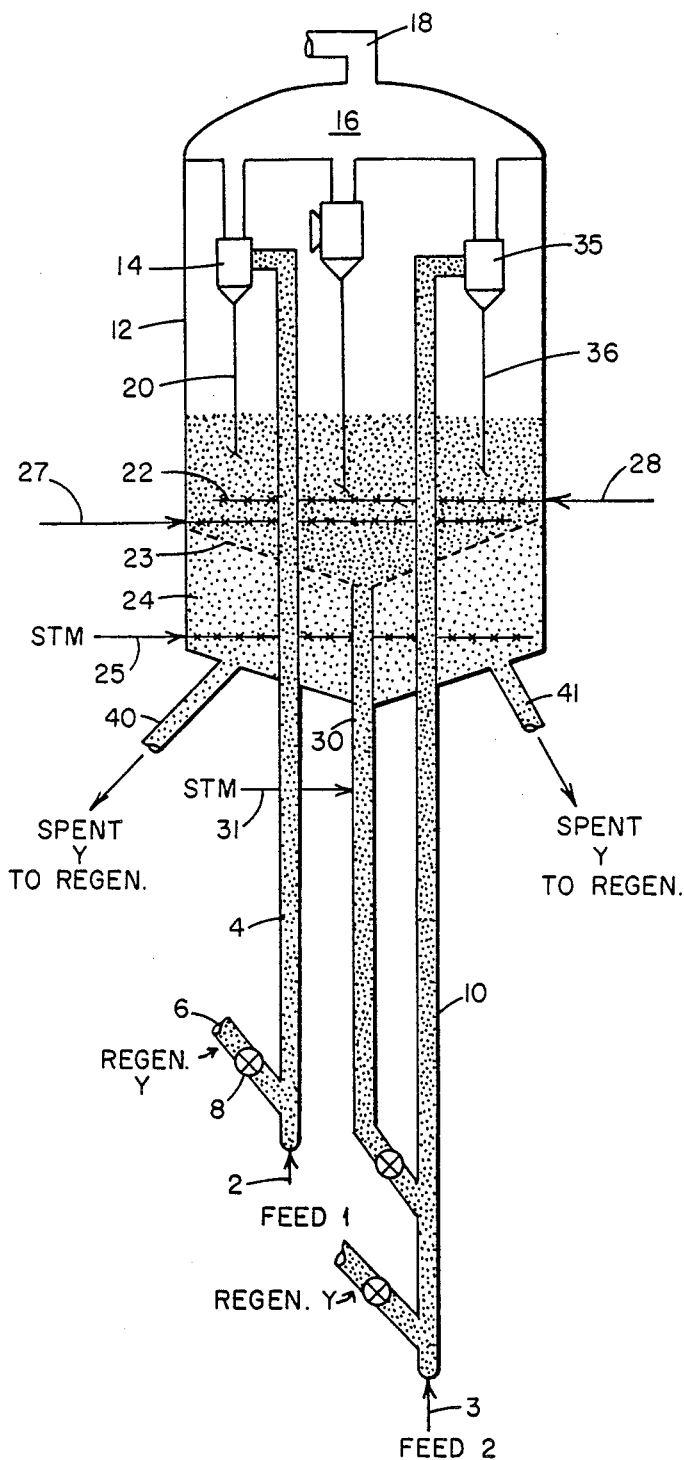

As shown in FIG. 2, which is illustrative of another dual riser fluid catalytic cracking operation in accordance with this invention, a gas oil feed (Feed 1) is introduced to a first riser 4 by conduit 2, mixed with hot regenerated zeolite Y containing cracking catalyst in conduit 6 containing flow control valve 8 to form a suspension of catalyst particles in oil vapors which pass upwardly through the riser maintained at an elevated temperature of at least about 1000° F. The individual particles of zeolite Y catalyst are appreciably smaller and less dense than the particles of ZSM-5 catalyst which is also utilized in the conversion process. Riser 4 discharges directly into a cyclone separator 14 housed in the upper portion of vessel 12. In cyclone separator 14, hot cracking catalyst is separated from hydrocarbon product of cracking. Separated hydrocarbon vapors pass into plenum chamber 16 and are removed therefrom by conduit 18 for separation in downstream equipment (not shown). Spent cracking catalyst separated in cyclone 14 is conveyed by dipleg 20 into catalyst bed 22. A conically shaped perforate plate or sieve 23 separates the larger, denser ZSM-5 catalyst particles from the zeolite Y catalyst particles, the latter passing through the sieve to the lower section 24 of the stripping zone. Stripping gas, in this case steam, is introduced through conduit 25 where it removes entrained hydrocarbon material from both catalyst components. The ZSM-5 catalyst particles gravitate toward the bottom of sieve 23 and eventually enter return conduit 30 provided with a source of low pressure steam 31 which blows smaller, less dense particles of zeolite Y which may have become entrained with the ZSM-5 catalyst particles back up into catalyst bed 22. Zeolite Y catalyst particles entering lower section 24 of the stripping zone are, following stripping, conveyed through one or more conduits 40 and 41 to the catalyst regeneration zone. Following regeneration, the zeolite Y catalyst is reintroduced to first riser 4 and/or second riser 10.

In second riser 10, a suspension of ZSM-5 catalyst of larger particle size and greater density than the zeolite Y catalyst particles and a catalytic naphtha and/or virgin straight run naphtha (Feed 2) introduced through conduit 3 is caused to be formed providing a mix temperature selected from within the range of 400° to 1000° F. and a ZSM-5 catalyst to charge stock ratio of from about 2:1 to about 10:1. The catalyst-hydrocarbon suspension thus formed is caused to move through riser 10 under conditions providing a catalyst contact time of from about 2 to about 20 seconds. The suspension of catalyst and hydrocarbon vapors continues to move upwardly through riser 10 and is discharged into one or more cyclonic separators 35 provided with dipleg 36. Separated catalyst enters bed 22 where it is separated into its ZSM-5 and zeolite Y components by the aforedescribed sieving operation, the conversion products meanwhile being combined with the other gaseous streams in plenum chamber 16 for transfer through conduit 18 to a downstream separation facility (not shown).

In order to enhance the overall efficiency of the operation, a light olefin feed, e.g., a gas rich in ethylene can be introduced into the lower section of catalyst bed 22 containing a concentration of ZSM-5 catalyst particles through conduit 27 to produce higher weight products and an exotherm which improves the absorption efficiency of the stripping operation. In general, the quantity of light olefin feed should be such as to increase the temperature of the catalyst bed in this region by at least about 50° F., and preferably by at least about 100° F. To accomplish this, from about 0.5 to about 20, and preferably from about 1 to about 10, weight percent of light olefin feed can be introduced into this phase by weight of total catalyst present in the stripper. Ordinarily, then, the temperature of the catalyst bed will increase from its usual range of about 880°–1150° F. to about 930°–1250° F. and even higher. This increase in spent catalyst bed temperature significantly enhances the stripping, or desorption, of hydrocarbons and, where present, sulfur compounds, which are entrained by the catalyst particles. Thus, in carrying out the foregoing improved stripping process, it is possible to increase the recovery of such entrained hydrocarbons by from about 5 to about 30 weight percent or more compared to substantially the same stripping procedure carried out in the absence of the exothermic conversion reaction herein. Optionally, where the light olefin feed in line 27 is predominantly made up of ethylene, one or more other highly reactive light olefins, e.g., propylene, butylene or mixtures thereof, can be introduced into the lower catalyst phase through a separate conduit 28 in order to take advantage of the higher partial pressure of the ethylene contained in the feed stream introduced through line 27 located therebelow. Amounts of $C_3$ and/or $C_4$ olefin material ranging from about 0.1 to about 5, and preferably from about 0.2 to about 3, weight percent of the entire catalyst bed can be suitably employed.

From the foregoing, it will be appreciated that due to the separation of ZSM-5 catalyst particles from zeolite Y catalyst particles in the stripper, it is possible to have much of the ZSM-5 catalyst bypass the regenerator altogether. As a result, the ZSM-5 catalyst particles are retained in the catalyst inventory at a higher level of activity therein for a longer average period of time than would be the case were they to circulate through the system more or less together with the zeolite Y catalyst particles.

Having thus provided a general discussion of the present invention and described specific embodiments in support thereof, it is to be understood that no undue restrictions are to be imposed by reason thereof except as provided by the following claims.

What is claimed is:

1. A process for producing gasoline comprising contacting a hydrocarbon feed having an initial boiling-point of at least 400° F., a 50% boiling of at least 500° F. and an end boiling point of at least 600° F., in a first riser, with a two component catalyst under fluid catalytic cracking conditions wherein at least one component of the catalyst is stripped in a stripping unit to remove entrained hydrocarbons, and regenerated wherein the two component catalyst comprises a first catalyst component selected from the group consisting of an amorphous cracking catalyst and a large pore cracking catalyst, whereby a product comprising olefins and naphta is produced;
   introducing ethylene together with said two component catalyst to a second riser, for contacting ethylene with a second catalyst component which is a shape selective medium pore crystalline silicate zeolite to produce products heavier than ethylene and to increase the temperature of the catalyst to an optimum temperature for upgrading naphtha; and
   introducing to the second riser, downstream of the point of ethylene introduction, naphtha for contact with said catalyst at said optimum temperature and said naphtha is upgraded to gasoline product.

2. The process of claim 1 wherein the first catalyst component is a large pore crystalline silicate zeolite.

3. The process of claim 1 wherein the first catalyst component contains a large pore crystalline silicate zeolite selected from the group consisting of zeolite X, Y, REY, USY, RE-USY, mordenite and mixtures thereof and the second catalyst component is selected from the group consisting of ZSM-5, ZSM-11, ZSM-12, ZSM-23, ZSM-35, ZSM-38 and ZSM-48.

4. The process of claim 1 wherein the hydrocarbon feed having an initial boiling point of at least 400° F. is selected from the group consisting of gas oil and resid and the naphtha charge material is selected from the group consisting of straight run naphtha and catalytically cracked naphtha.

5. The process of claim 1 wherein the difference between the average particle size of the first and second catalyst components is such as to permit their separation within the stripping unit by sieving.

6. The process of claim 5 wherein the average particle size of the first catalyst component is greater than that of the second catalyst component.

7. The process of claim 5 wherein the average particle size of the second catalyst component is greater than that of the first catalyst component.

8. The process of claim 7 wherein at least one physical property selected from the group consisting of average particle size, density and shape of the second catalyst component is different from that of the first catalyst component.

9. The process of claim 8 wherein the average particle size of the first catalyst component ranges from about 20 to about 150 microns and the average particle size of the second catalyst component ranges from about 500 to about 70,000 microns, the average packed density of the first catalyst component ranges from about 0.4 to about 1.1 gm/cm$^3$ and the average packed density of the second catalyst component ranges from about 0.6 to about 4.0 gm/cm$^3$.

10. The process of claim 9 wherein the average particle size of the first catalyst component ranges from about 50 to about 100 microns and the average particle size of the second catalyst component ranges from about 1000 to about 25,000 microns.

11. The process of claim 10 wherein the second catalyst component is composited with a matrix material which imparts a density to said component which is greater than the density of the first catalyst component.

12. The process of claim 11 wherein the second catalyst component is composited with a matrix material which possesses a coking rate which is higher than the coking rate of the first catalyst component.

13. The process of claim 1 wherein the first catalyst component contains a large pore crystalline silicate zeolite.

14. The process of claim 13 wherein the first catalyst component contains a large pore crystalline silicate zeolite selected from the group consisting of zeolite X, Y, REY, USY, RE-USY, mordenite and mixtures thereof and the second catalyst component is selected from the group consisting of ZSM-5, ZSM-11, ZSM-12, ZSM-23, ZSM-35, ZSM-38 and ZSM-48.

15. The process of claim 5 wherein the first catalyst component contains a large pore crystalline silicate zeolite.

16. The process of claim 15 wherein the first catalyst component contains a large pore crystalline silicate zeolite selected from the group consisting of zeolite X, y, REY, USY, RE-USY, mordenite and mixtures thereof and the second catalyst component is selected from the group consisting of ZSM-5, ZSM-11, ZSM-12, ZSM-23, ZSM-35, ZSM-38 and ZSM-48.

17. The process of claim 1 which further comprises passing the second catalyst component to a stripping unit wherein an exothermic reaction is carried out to improve the efficiency of stripping.

* * * * *